THOMAS G. NEWNAM.
Combined Shovel and Tongs.
No. 125,480.                      Patented April 9, 1872.
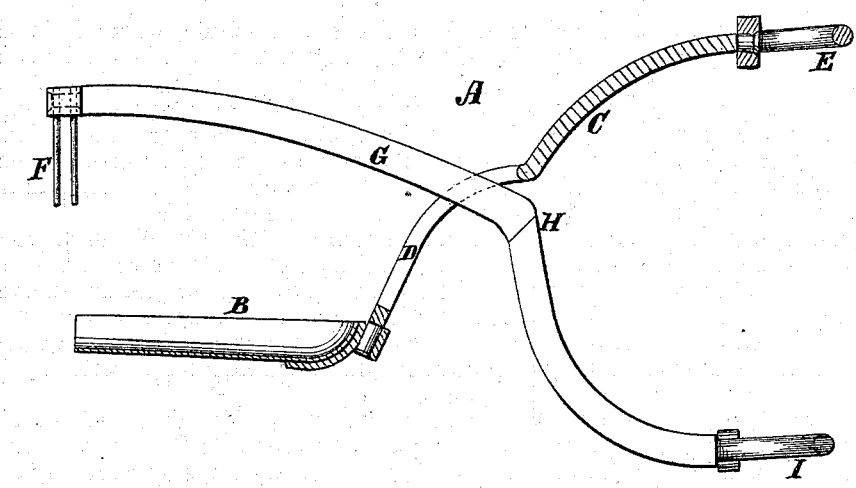
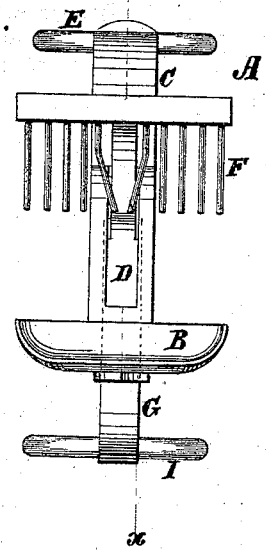

UNITED STATES PATENT OFFICE.

THOMAS G. NEWNAM, OF PLEASANT HILL, MISSOURI.

IMPROVEMENT IN COMBINED SHOVELS AND TONGS.

Specification forming part of Letters Patent No. 125,480, dated April 9, 1872.

Specification describing a new and Improved Combined Shovel and Tongs, invented by THOMAS G. NEWNAM, of Pleasant Hill, in the county of Cass and State of Missouri.

This invention relates to a new and useful improvement in an implement for handling live or other coals, brands of fire, and other articles, designed to be used as a substitute for the separate shovel and tongs in common use; and it consists in a shovel-blade on a slotted handle, and in a wire brush or rake on the end of a handle, which works in the slot of the shovel-handle; the construction and arrangement of parts being as hereinafter more fully described.

In the drawing, Figure 1 represents a sectional plan view of the two parts, the section being on the line $x\ x$ of Fig. 2. Fig. 2 is an end view.

Similar letters of reference indicate corresponding parts.

A is the combined shovel and tongs. B is the shovel bowl or blade. C is the shovel-handle, in which is a long slot, D. This handle is bent so as to form two arcs of circles, with a ring-handle, E, at the end to take hold of. F is a brush or fine rake on the end of the handle G. This handle passes through the slot D in the shovel-handle, where it is allowed to play longitudinally, and up and down, according to the purpose for which the implement is to be used. The form of this handle G is seen in Fig. 1. H is a shoulder, which limits the distance which this handle G extends through the slot D. I is a ring-handle to take hold of on the end of G.

It will be seen that the shovel can be used to take up ashes, &c., and that coals can be raked onto the shovel by a longitudinal movement of the handle G, and that a brand of fire, stick of wood, or other article can be griped between the parts and handled as with a pair of tongs.

I do not confine myself to the precise form or arrangement of the parts described, as they may be varied in many ways without departing from my invention.

Having thus described my invention, I claim as new and desire to secure by Letters Patent—

The combined shovel and tongs A, constructed substantially as shown and described.

THOMAS G. NEWNAM.

Witnesses:
   WM. HEINS,
   GEO. STOLY.